C. A. FOSTER.

Meat Chopper.

Reissued July 23, 1867.

No. 2,700.

Witnesses:
Samuel N Alper
George Andrews

Inventor:
Calvin A Foster
by his attorney
R Wildy

N. PETERS, Photo-Lithographer, Washington, D. C.

United States Patent Office.

METROPOLITAN WASHING MACHINE COMPANY, OF MIDDLEFIELD, CONNECTICUT, ASSIGNEES BY MESNE ASSIGNMENTS OF C. A. FOSTER.

*Letters Patent No.* 55,414, *dated June* 5, 1866; *reissue No.* 2,700, *dated July* 23, 1867.

IMPROVED MEAT-CHOPPER.

The Schedule referred to in these Letters Patent and making part of the same.

TO WHOM IT MAY CONCERN:

Be it known that CALVIN A. FOSTER, of Winchendon, in the State of Massachusetts, invented certain new and useful Improvements in Machines for Chopping Meat, of which improvements the following is hereby declared to be a full, clear, and exact description, reference being had to the accompanying drawings, in which—

Figure 1:
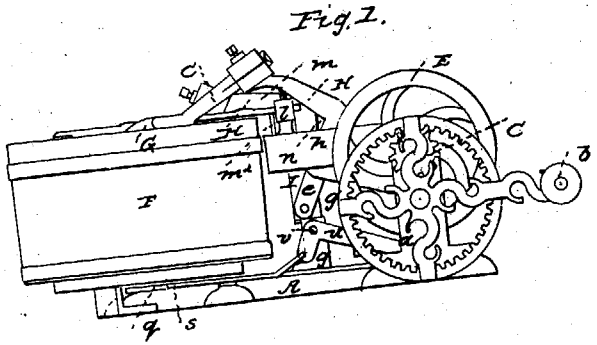

Figure 1 is a side elevation of a machine constructed in accordance with his invention.

Figure 2:
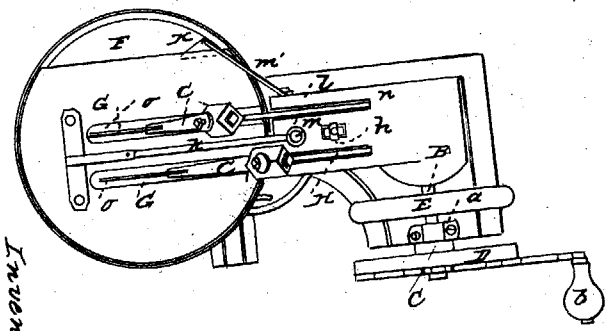

Figure 2 being a longitudinal section, and

Figure 3:
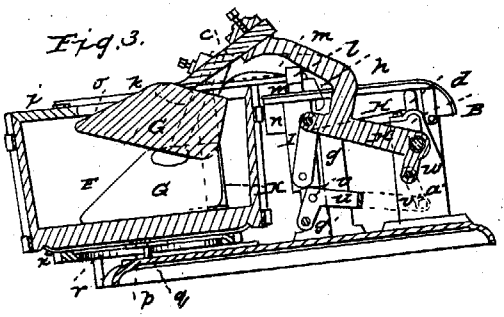

Figure 3 a top view of the same.

The machine to which the improvements, the subject of this application, are applied is one in which one or more vibratory cutters having a descending and transverse or "draw" stroke are combined with a tub or block which contains the material to be cut. The invention relates, first, to the method of effecting the rotation of the tub, and, secondly, to the arrangement and combination of the cutters and their operative mechanism, and it essentially consists in—

1. The combination, with the vibratory cutters having a draw stroke, of a tub and suitable mechanism for rotating the same in such manner that the rotation shall be effected intermittently and while the cutters are lifted from the bottom of the tub.

2. Forming the frame of the machine in two parts—one stationary, the other swinging or movable—the two being connected by a horizontal hinge-joint, or its mechanical equivalent.

The advantages arising from the first-mentioned feature of the invention are apparent, and therefore need not be recited here.

The method of forming the frame of two parts, hinged or otherwise suitably connected together, which constitutes the second feature of the invention, admits of the vibratory cutters and such other of the parts which overhang or are contained within the tub, being so combined with the movable part as that they may be bodily lifted from the tub when occasion requires. By this means ready access may be had at all times to the contents of the tub, which contents can be handled or removed with facility, or the tub itself, if it be desired, can be lifted out from its seat, the cutters and other overhanging parts being swung or tilted back so as to be entirely out of the way. The steadiness of the machine, when the cutters are operating, is insured by means of a locking device, which holds the two parts of the frame firmly and tightly together.

To enable others skilled in the art to understand and use the invention, the manner in which the same is or may be carried into effect will now be described by reference to the drawings accompanying and forming part of this specification.

In the drawings, A denotes the sustaining frame of the machine, and B the main or driving-shaft carrying the fly-wheel E, and rotated through the medium of a pinion, C, which engages with an internal gear, D, mounted on one of the posts *a a'* of the frame. By turning the gear D by means of a crank, *b*, extending from such gear, the driving-shaft will be put in revolution. F is the tub, and G G the two chopping-knives. Each of such knives, in its operation, is moved up and down and forward and backward within the tub, whereby it is made to cut with a drawing stroke any meat when in the tub. The shank *c* of each knife is fastened in one of two bent levers or carriers, H H, formed as shown in the drawings. At its rear end each of the said levers is jointed to one of two cranks *d d*, extending from the driving-shaft, one of such cranks being what is termed a bell-crank. At or near its middle each of the carriers is also jointed to the upper end of one of the rocker-arms *e e*, whose lower ends are jointed to the movable part of the frame hinged at its rear end to the shaft-post *a'*, so as to be capable of being turned up in a vertical plane. When down in its lowermost position the arm rests on a step or bearing, *f*. A post, *g*, extends upward from the frame A, and when the arm is on the step *f* such post *g* projects through an aperture made in the said arm. A turn-button, *h*, applied to the upper end of the said post, serves to enable the arm to be held down upon the step. The cap or cover *i* of the tub is also secured to the arm I by means of a rod, *k*, extending from the cover and into a post, *l*, on the arm, such rod being fastened to the post by a set-screw, *m*. The plough K of the tub is also attached to an arm, $m^2$, extending from the swinging arm or frame I, or is inserted in a socket applied to it, or to a guard-plate, *n*, attached to the said frame.

From the above it will be seen that when the movable frame is lifted or swung back, such frame will not only raise the knives and the plough out of the tub, but at the same time will raise the segmental cover *i* away from the tub so as to uncover it. The said cover is to be formed with slots or passages, *o o*, for the knife-shanks to go through. The tub is supported on a cross, *p*, which revolves on a pivot, *q*, and has an interior ratchet, *r*, fixed to its under side concentrically with the pivot *q*. A draw-pawl, *s*, applied to the ratchet, and pressed toward it by a spring, *t*, and arranged as represented, has its rear end jointed to the shorter arm of a bent lever, *u*, which turns vertically on a fulcrum, *v*, extended from the post *g'*. The longer arm of the lever *u* is jointed to the connecter $v^2$, which, in turn, is jointed to an arm, *w*, projecting from one of the carriers H H. A small stud, *x*, extends down from the bottom of the tub, and by contact with the edge of one of the arms of the cross, causes the cross, while in revolution, to revolve the tub. When the machine is in operation the vibratory motion of the carriers H causes a back and forth movement of the pawl and its actuating mechanism, and consequently effects the intermittent rotation of the tub. The arrangement of the mechanism is such, as shown in the drawings, that the rotation of the tub only takes place during the interval between the stroke of the cutters and while the knives are removed from contact with the tub.

What is claimed as the invention of the said CALVIN A. FOSTER, is as follows:

1. The combination, in a meat-chopping machine, with a vibratory cutter or cutters having a descending and transverse stroke, of a tub, and mechanism for rotating the same intermittently, *i. e.*, during the intervals between the strokes, or while the cutter or cutters are lifted off the bottom of the tub.

2. Forming the frame in two parts—one stationary, the other movable—the two being connected together by a horizontal hinge-joint, or its mechanical equivalent.

3. In a meat-chopper frame, composed of two parts united by a hinge-joint, as described, the combination with the movable part thereof of the vibratory cutters and such appurtenances of the machine as overhang or are held within the tub, so that the said cutters and appurtenances may be bodily lifted out of the tub. as and for the purposes described.

4. The combination with the stationary and movable frames of the locking device.

In witness whereof I, M. W. TERRILL, President of the Metropolitan Washing Machine Company, acting for and in behalf of the said company, have hereunto set my hand before two subscribing witnesses.

M. W. TERRILL, *President.*
METROPOLITAN WASHING MACHINE COMPANY,

Witnesses:
LYMAN A. MILLS,
E. G. SHERWOOD.